United States Patent [19]

Fackrell et al.

[11] Patent Number: 5,468,513

[45] Date of Patent: Nov. 21, 1995

[54] HONEY PRODUCTS

[75] Inventors: Robert N. Fackrell; Lorenzo P. Griffeth, both of Preston, Id.

[73] Assignee: Creamery Hollow U.S.A., Inc., Preston, Ohio

[21] Appl. No.: 230,632

[22] Filed: Apr. 21, 1994

Related U.S. Application Data

[63] Continuation-in-part of Ser. No. 221,068, Mar. 31, 1994.

[51] Int. Cl.⁶ .......................... A23C 15/16; A23C 15/06; A23C 15/18; A23D 7/015

[52] U.S. Cl. .......................... 426/663; 426/583; 426/580; 426/581; 426/586; 426/587; 426/604

[58] Field of Search ...................... 426/663, 583, 426/580, 581, 604, 586, 587

[56] References Cited

U.S. PATENT DOCUMENTS

| | | | |
|---|---|---|---|
| 3,615,718 | 10/1971 | Weinstein | 99/136 |
| 4,769,255 | 9/1988 | Ahmed et al. | 426/603 |
| 4,770,892 | 9/1988 | Grealy et al. | 426/570 |
| 5,084,295 | 1/1992 | Whelan et al. | 426/565 |

OTHER PUBLICATIONS

Hoshino et al JP 000015, 1972 (Abstract only).

*Primary Examiner*—Jeanette Hunter
*Assistant Examiner*—Choon P. Koh
*Attorney, Agent, or Firm*—Hughes, Multer & Schacht

[57] ABSTRACT

Honey butters prepared from a honey and dairy cream. Lecithin and/or a stabilizer can be added to the dairy cream to optimize the product. Dairy products—milk, skim milk, and dairy fats—are employed as required to adjust the fat content of the product; and optional ingredients may be added to, inter alia: adjust the texture of the product, inhibit oxidation and otherwise extend shelf life, alter color, and enhance flavor. The product may have a fat content low enough to qualify it as a reduced fat or even a light (or lite) honey butter.

39 Claims, 2 Drawing Sheets

FIG. 1A

| FIG. 1A | FIG. 1B |

FIG. 1B

HONEY PRODUCTS

CROSS REFERENCE TO A RELATED APPLICATION

The present invention is a continuation-in-part of application No. 08/221,068 filed 31 Mar. 1994.

TECHNICAL FIELD OF THE INVENTION

The present invention relates to novel, improved, butter products with a honey flavor.

DEFINITIONS

The term "reduced fat" is used herein as in 21 CFR §101.62 to designate a butter with a fat content at least 25 percent lower than that of conventional butter.

The terms "light" and "lite" are used herein to identify products with a fat content at least 50 percent lower than that of the reference food (conventional, full fat butter), see Baking & Snack, January 1993, p. 57.

The term "honey butter" is used generically herein to embrace light and reduced fat honey butters and other honey butters with a fat content below the 80 percent minimum of a full fat butter.

BACKGROUND OF THE INVENTION

Nutritional experts currently believe that the risk of cardiovascular disease can be decreased by reducing one's consumption of saturated fats. As conventional butter is required by federal law (Act of 4 Mar. 1923) to have a fat content of at least eighty percent, compliance with current nutritional guidelines essentially requires that the use of this flavorful and widely used spread be curtailed or that it be eliminated from one's diet.

Parent application No. 08/221,068 discloses certain new and novel, reduced fat content, butter products which can generally be consumed in moderate quantities, even by one on a voluntary or mandated, reduced fat diet.

The novel reduced fat content butter products disclosed in the '068 application have a flavor closely resembling, if at all distinguishable from, that of a conventional (full fat) butter. The consistency of the reduced fat content butter product can be anywhere from hard to very soft and spreadable at refrigeration temperatures, and whipped butters can be made.

Yet another advantage of the novel reduced fat content butter products disclosed in the parent application is that they are essentially free from weeping and oiling out. Furthermore, the process by which the products are made has the significant advantage that it does not require or employ ultrafiltration as does the process of making butter products disclosed in U.S. Pat. No. 4,769,255 issued 6 Sep. 1988 to Ahmed et al. Ultrafiltration equipment requires a significant financial investment and furthermore generates a waste product which presents a significant disposal problem in that it cannot be dumped or discharged into a sewer.

SUMMARY OF THE INVENTION

It has been discovered that there is a considerable demand for reduced fat content butter products which have a honey flavor and are spreadable at refrigeration and even freezer temperatures, particularly products of that character in the reduced fat and light categories.

Disclosed herein are novel, reduced fat content honey butters of the character described in the preceding paragraph and novel processes for making those products at acceptable cost and without the generation of polluting effluents.

The essential ingredients of these novel honey butters are dairy cream (sweet cream or whey cream) and honey. Optimal products may be obtained by the addition of lecithin or a stabilizer or both a stabilizer and lecithin. Milk, skim milk, and dairy fats can be employed if and as necessary to adjust the fat content of the product; and there are a number of other optional ingredients which can be employed to advantage. These include: (1) milk protein concentrates and whey protein concentrates, both used as texturing agents and to control the firmness of the product; (2) salt, which is a flavorant; (3) the antioxidant Vitamin E (tocopherol); (4) Vitamin A, which is employed as necessary to ensure that the product has a sufficiently high content of this vitamin for the product to be labelled a butter; (5) a coloring agent (typically beta carotene or annatto); (6) potassium sorbate and sodium benzoate or other shelf life extenders such as sodium citrate or disodium phosphate; (7) microbial flavor enhancing and shelf life extending constituents—bacterial cultures and cultured skim milk; and (8) flavorants, typically flavor enhancers rather than flavor modifiers.

Honey butters as disclosed herein may have a fat content ranging from 9 to 50 percent. Butter-to-honey ratios in the range of 20 to 80 percent have been successfully employed.

The honey butters of the present invention are made by first adjusting the fat content of the dairy cream to the extent necessary for the product to have the selected fat content with milk (decreases fat content) or a milk fat (increases fat content). This step is omitted if the dairy cream has that fat content which will give a product with the wanted fat content.

Any optional ingredients that are to be employed (except for bacterial cultures) are then mixed into the base (dairy cream or dairy cream plus milk or milk fat) or mixture of base and optional ingredient(s) until they are uniformly distributed. The feedstock (base or mixture) is heated to an elevated temperature and held at that temperature for a long enough period of time to pasteurize the feedstock and to develop flavor with the flavor becoming nuttier as the heating is continued.

Next, if employed, the lecithin is added to the pasteurized feedstock. The stabilizer can also be added at this time if one is to be employed. This is not a requisite, however, as the stabilizer can be added at any time after the temperature of the feedstock reaches a temperature above the melting point of the stabilizer.

At this point in the process, the honey is typically blended with the pasteurized feedstock. The preferred honeys are prepared by first pasteurizing the honey and then adding diatomaceous earth, which absorbs enzymes and some minerals from the honey. The diatomaceous earth and its burden of unwanted constituents is then removed from the honey by filtration. Honeys treated as just described are commercially available from Dutch Gold Honey, Inc., Lancaster, Pa. Honey butters made in accord with the principles of the present invention with such honeys have an extended shelf life significantly longer than the twelve hour to two week shelf life of honey butters made with other honeys.

Once the honey has been thoroughly blended with the feedstock, the temperature of the resulting blend is adjusted, if necessary, to a temperature at which the blend can be successfully homogenized. Homogenization is preferably effected in a two-stage homogenizer. By the end of the homogenization step fat and liquid in the feedstock will have undergone a phase reversal, forming a predominantly liquid-in-fat dispersion.

Following homogenization, the product is cooled, whipped, and packaged.

If milk protein concentrates and/or whey protein concentrates are present, the pre-pasteurization blend is held at an elevated temperature to promote rehydration of the proteins in the concentrate(s) and then held at refrigeration temperature to complete rehydration prior to pasteurization and homogenization.

The objects, advantages, and important features of the present invention will be apparent to the reader from the foregoing and the appended claims and as the ensuing detailed description and discussion proceeds in conjunction with the accompanying drawing.

DETAILED DESCRIPTION OF THE INVENTION

The novel, honey butters of the present invention are made from sweet cream or whey cream (generically referred to herein as "dairy cream") and honey. Products of optimal quality contain lecithin, which is a phosphatidyl choline commonly incorporated in a variety of food products for emulsifying, dispersing, and other properties and a stabilizer utilized in combination with the lecithin to adjust the firmness, spreadability, and meltability of the product. A non-fat or other milk can be used to lower the fat content of the product; and dairy fats such as concentrated milk fat, dairy cream of higher fat content, conventional butter, anhydrous milk fat, and butter oil can be used to increase the product's fat content. A variety of optional ingredients can be employed to increase the nutritional value of the product; to inhibit oxidation of the product; to extend its shelf life; and to adjust the color, flavor, and texture of the product.

The general formula of the honey butters of the invention appears in Table 1 below.

TABLE 1

|  | Weight Percent |
| --- | --- |
| Essential Ingredients |  |
| Dairy Cream | 25 to 99 |
| Honey | 20 to 80 |
| Optimal Product Ingredients |  |
| Lecithin | 0.02 to 2.0 |
| Stabilizer | 0.02 to 2.5 |
| Optional Ingredients |  |
| Milk Protein Concentrate | 0.1 to 4 |
| Whey Protein Concentrate | 0.02 to 3 |
| Cultured Skim Milk Powder | 0.02 to 3.0 |
| Salt | 0.05 to 2 |
| Vitamin E | 0.002 to 0.1 |
| Vitamin A | 0.001 to 0.009 |
| Coloring Agent(s) | 0.0001 to 0.01 |
| Preservative(s) | 0.0032 to 0.05 |
| Microbial Culture(s) | 0.02 to 10 |
| Flavorant(s) | 0.0001 to 0.05 |

The dairy creams that can be employed are sweet cream and whey cream. The fat content of commercially available dairy creams ranges from 25 to 80 percent.

The dairy cream may have a fat content exceeding that wanted in the honey butter being made. In such circumstances, the dairy cream is diluted with milk or a non-fat milk to bring the fat content of the product down to the wanted level.

In other circumstances, the selected dairy cream may have a fat content lower than that wanted in the final product. In this case, concentrated milk fat, butter, dairy cream with a higher fat content, anhydrous milk fat, or butter oil may be employed to increase the fat concentration.

Concentrated milk fat is a separated cream with a fat content of 80 percent. Anhydrous milk fat and butter oil are respectively made by removing the moisture from cream and conventional butter. Both products have a fat content of 99.8 percent or higher.

Lecithin is employed in the honey butters disclosed herein for its effect on the texture and firmness of the final product, for its ability to inhibit syneresis, and for its emulsifying ability. This ingredient also can be employed to improve the melting characteristics of the product.

The preferred stabilizers are proprietary combinations of mono glycerides and diglycerides supplied by Grinstead Products, Inc. under the name Dimodan-O. Other, commercially available mono glyceride and diglyceride stabilizers may work well in adjusting firmness but those so far tried have given the product an off flavor. Other stabilizers such as gelatin may also be employed.

In conjunction with the lecithin, the pressure(s) under which the blend of selected ingredients is homogenized, and any protein concentrates that are employed, the glyceride stabilizer acts to impart the wanted degree of firmness to the honey butter and to minimize syneresis.

The milk protein concentrate and whey protein concentrate employed as optional ingredients in the honey butters disclosed herein are commercially available powders. These ingredients are employed in the stated amounts to increase the protein level of the honey butter, to adjust the firmness of the product, and/or to inhibit the exudation of moisture and oil from the product.

Milk and whey protein concentrates contain from 30 to 85 percent protein. They are supplied in powder form and are soaked in the fat-containing base, milk, or, less preferably, water at refrigeration temperature for (typically) 3 to 12 hours to rehydrate the powder and relax the proteins. Rehydration is furthered by holding the feedstock in which the proteins are incorporated first at an elevated temperature and then at refrigeration temperature.

Cultured skimmed milk, available under the trade name Microgard, acts as a shelf-life extender. It also tends to improve the flavor profile of the honey butters.

Salt is a flavor enhancer and can be omitted as it is in conventional unsalted butters.

Vitamin E is routinely added to a variety of food products as an antioxidant, and it is optionally employed in that capacity in the products disclosed herein.

Vitamin A, preferably in the palmitate form, is employed only as necessary to ensure that the product contains enough vitamin A for it to be legally labeled as a butter.

Microbial cultures are optionally employed in lieu of, or in addition to, cultured skim milk to change the flavor profile of the honey butter and/or to extend its shelf life. Any of the commercially available lactic cultures such as that supplied by LSI Specialty Products, Inc. can be employed for this purpose. The lactic culture is preferably added at a temperature of 70°–80° F. as it is most active and best able to fulfill its functions at temperatures in this range.

A conventional foodstuff coloring agent is optionally used to impart a richer yellow color to the honey butter. Beta carotene is typically used for this purpose. Other coloring agents such as annatto can be used instead.

Literally hundreds of flavoring agents are available. Many of those which have been evaluated are unacceptable because they impart a margarinelike smell to the product. Flavorants that can however be employed to advantage in the honey butters, especially those which have a low fat content and therefore tend to be perhaps less flavorable, are the flavor enhancers supplied by Grinstead. These additives enhance the flavor of the product without significant modification of flavor or other properties. Grinstead flavor enhancers are employed in extremely small amounts—typically on the order of 0.0025 percent, which works out to 8 grams of flavor enhancer for a 700 pound batch of product.

A number of conventional preservatives or shelf life extenders are available. A mixture of potassium sorbate and sodium benzoate in equal proportions has proven effective. The mixture of potassium sorbate and sodium benzoate preservatives may initially impart a slight bitter taste to the honey butter. However, that taste rapidly disappears and cannot be detected within a few days after the product is made.

Figures 1, 1A:
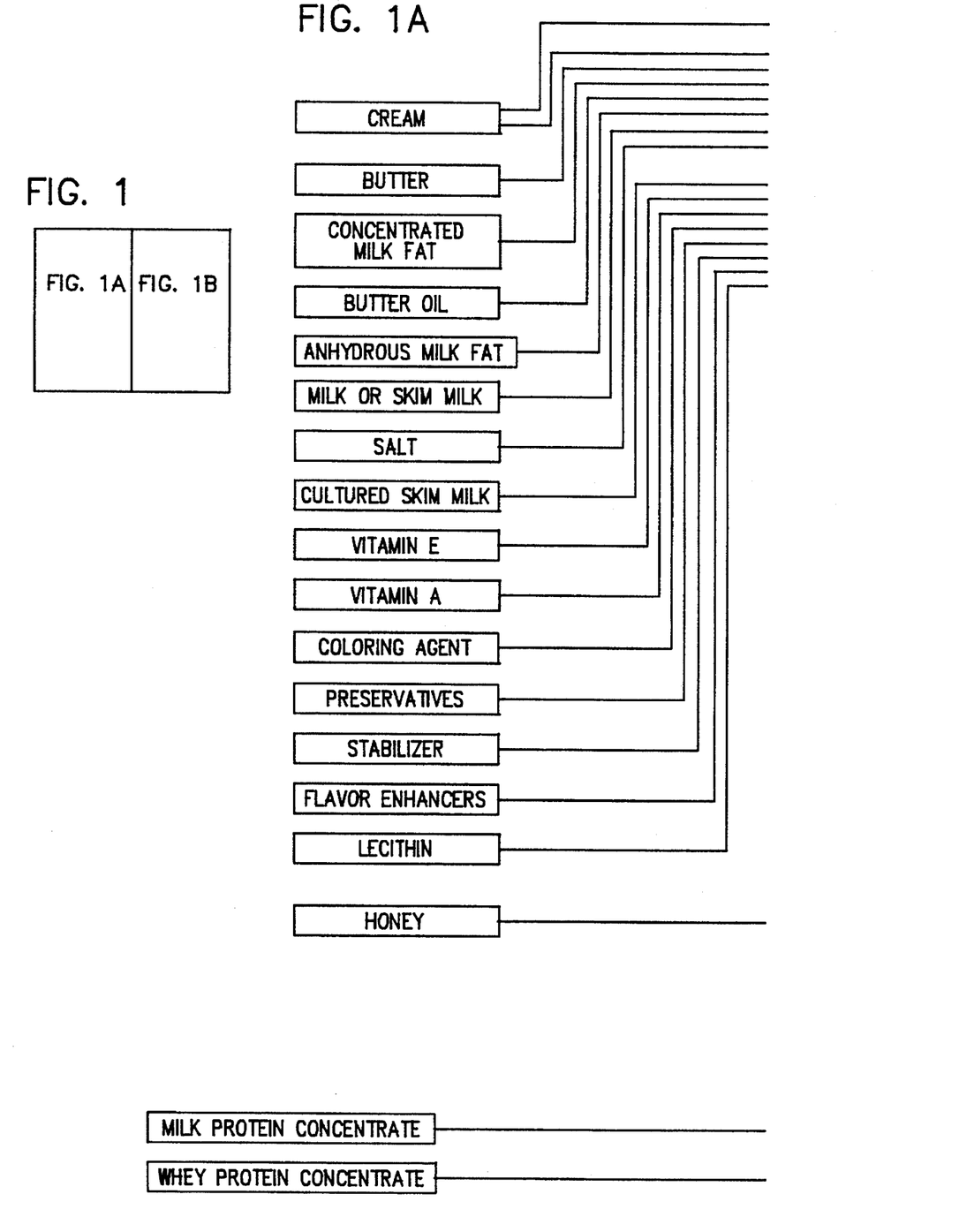
FIG. 1 shows the relationship between FIG. 1A and FIG. 1B which, taken together, constitute a block diagram of one exemplary system for making honey butters embodying the principles of the present invention.
Figure 1B:
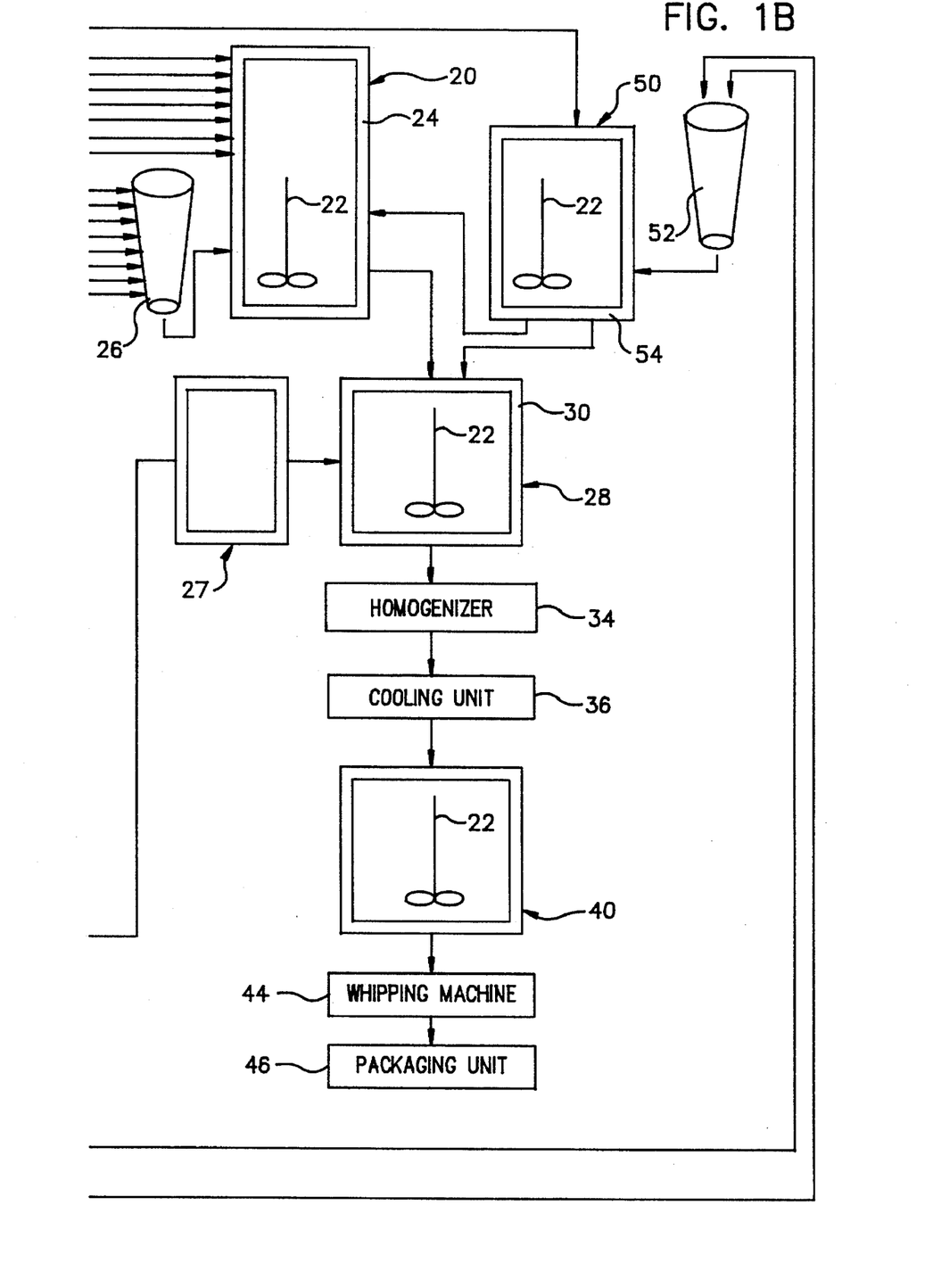

Referring now to the drawing, the initial step in a typical application of the present invention is: (1) the reduction of the fat content of the honey butter that is being made by the addition of a diluent—skim milk or milk—to the selected sweet or whey cream, or (2) the addition of dairy fat (dairy cream of a higher fat content, butter, concentrated milk fat, butter oil, or anhydrous milk fat) to the dairy cream to increase the fat content of the final product. This step is omitted if the dairy cream has a fat content which will result in the honey butter also having the wanted fat concentration.

To adjust fat content, the dairy cream and the selected diluent or dairy fat are introduced with agitation into an appropriate vessel such as the illustrated jacketed tank 20, which is equipped with an agitator 22.

Dairy fats are rigid at refrigeration temperatures. Therefore, if a dairy fat is being used to adjust fat content upwardly, the dairy cream is heated to a temperature above 100° F. through the introduction of steam into the jacketed interspace 24 of tank 20 before the fat is added to the cream.

At this point, and if they are to be used, the salt and microbial inhibiting cultured skim milk powder are also added to the cream or mix in the jacketed tank through a standard powder horn/venturi blender 26. This introduction takes place with agitator 22 running.

Next, and with agitator 22 still running, any other selected, optional ingredients are introduced into jacketed vessel 20.

The temperature of the process vessel contents (the feedstock) is then raised to a temperature in the range of 150° to 210° F. and preferably on the order of 195° F. by the continued introduction of steam into interspace 24. The contents are held at the selected temperature for a period long enough to pasteurize and develop the flavor desired in the material. Pasteurization is effected by holding the tank contents at the selected temperature for periods ranging from 45 minutes at 150° F. down to 15 seconds at 210° F. Depending on the temperature, holding times of 15 seconds to three hours (including pasteurization time) are employed for flavor development with: (a) longer holding times at lower temperatures, or (b) higher temperatures being used to generate a nuttier flavor in the product.

Typically toward the end of pasteurization and flavor development, the lecithin is added. Introduction of the lecithin is deferred to this point in the process to minimize the exposure to elevated temperatures of this relatively heat-sensitive constituent. If pasteurization and/or flavor development is carried out at a temperature toward the upper end of the indicated range, the holding time at temperature may be so short that the lecithin can not be completely blended in during the hold time. In that case, the introduction of the lecithin is driven by blending time with the constituent being added early enough to ensure that it is fully blended.

The stabilizer can be added at the same point in the process as the lecithin. This is not essential, however, as the stabilizer can be added at any time the process vessel contents reach a temperature of 135° F. or higher.

As discussed above, it is preferred but not essential that the honey be one treated as described above or in an equivalent manner to remove constituents which might adversely affect the shelf life of the final product. In the representative system shown in the drawings, the selected honey is heated—if necessary—to a temperature high enough to make it readily flowable (typically 68° F. or higher) in jacketed tank 27. The honey is then piped directly to jacketed process vessel 28 and blended by agitator 22 with the pasteurized feedstock discharged into process vessel 28 from process vessel 20.

Once the honey and feedstock have been thoroughly blended, cold water or steam is circulated through the interspace 30 of tank 28 to adjust the temperature of the pasteurized mixture to a level at which that mixture can be successfully homogenized. Homogenization can be carried out at a temperature as high as 165° F. but is preferably accomplished with the blend at a temperature in the range of 140° to 145° F.

The homogenizer 34 for the honey-containing mixture is preferably, but not necessarily, a two-stage device. In each stage, the mixture is forced through a small orifice under pressure against a steel plate to break down the globules of fat in the mixture. By virtue of the fat globules being broken down and the mechanical forces imposed in the homogenizer, a phase reversal and formation of a predominantly liquid-in-fat emulsion is completed in the homogenizer.

In the practice of the present invention, the first stage of a two-stage homogenizer can be operated at pressures in the range of 200–3000 psi and the second stage at pressures in the range of 100–2,000 psi with the total of the two pressures being in the range of 300 to 5000 psig.

Homogenization pressure alone cannot be safely relied upon to produce a product which is consistent from batch-to-batch. However, this important and necessary goal is obtained by synergistically employing in combination with selected homogenization pressures lecithin and/or a glyceride or gelatin stabilizer in the concentrations identified above.

The product discharged from homogenizer 34 is a thick liquid. That product is transferred to a cooling unit 36, which may be a swept surface heat exchanger. Here, the homogenized product is cooled from the homogenization temperature to a temperature in the range of 33° to 65° F. The cooling temperature is important in that it has an impact on the texture of the final product.

The homogenized and cooled material can be transferred from cooling unit 36 to a jacketed, agitator-equipped tank or other holding unit 40. From process vessel 40—or directly from cooling unit 36—the product is transferred to a conventional whipping machine 44 such as the model CM-15 manufactured by Goodway Industries, Inc. Here, the feedstock/honey mixture is agitated in an inert, nitrogen environment; and nitrogen is incorporated into the mixture to generate a stable, light, porous structure and to inhibit oxidation of the product. The texture of the whipped product can be controlled by regulating the flow of the product through the whipping machine, the agitator speed, the whipping chamber pressure, and the pressure on the nitrogen within the whipping head.

For the Goodway machine, agitator speeds ranging from 200 to 2,000 rpm, nitrogen injection pressures of 10 to 40 psi, and whipping chamber pressures in the range of 10 to 30 psi have been found satisfactory. Different parameters may of course be found superior, or even necessary, depending upon the particular whipping machine that is being employed.

The whipped product is transferred from machine 44 to a conventional filling or other packaging machine 46 designed for whipped products.

It is important, for the sake of consistency, that the cooled product be whipped and packaged promptly. Otherwise the fats may crystalize as will a glyceride stabilizer if one is employed. This can significantly affect the firmness of the honey butter and important organoleptic properties such as texture and mouthfeel. To avoid graininess and unwanted changes in firmness and organoleptic properties, packaging is preferably completed in not more than 15 minutes after the homogenized product is cooled to the packaging temperature.

As time passes, the physical nature of the honey butter changes. Importantly, it becomes more firm although still soft enough to be spreadable at temperatures ranging from 0° F. to room temperature. The involved processes are completed in 12 hours to six days, depending on the cooling rate, which is determined in large part by the size of the container; and the honey butter remains stable thereafter.

If the feedstock in process vessel 20 contains a protein concentrate, the rehydration process must be completed before the mixture is pasteurized because the minimum preferred pasteurization temperature is 150° F.; and completion of the rehydration process is preferably carried out at a temperature of not more than 145° F. This is because higher temperatures tend to harden the protein concen trates, and this can impart a gritty mouthfeel to the final product.

As discussed above, the initial step in rehydration is carried out at refrigeration temperature by soaking the protein concentrate(s) in cream, milk, or water. The rehydration process is continued by blending the partially rehydrated proteins with the dairy cream in jacketed, agitator-equipped process vessel 50 and holding the mixture in that vessel at temperature to promote rehydration. The protein concentrates are introduced by means of powder horn/venturi blender 52 with the agitator 22 in process tank 50 running. After the protein concentrate(s) have been introduced, steam is let into jacketed interspace 54 to heat the process vessel contents to the selected rehydration temperature, typically 145° F. In a typical run, the mixture of dairy cream and protein concentrate(s) is held at the 145° F. temperature for 25 minutes to further rehydration. Next, chilled water is circulated through the jacketed interspace 54 of vessel 50 to cool the mix to a temperature in the 35°–45° F. range. Depending upon the concentration of proteins in the mix, it is held at this low temperature for 3–12 hours. This completes the rehydration of the proteins, which is carried out at the lower temperature so that the dairy cream will not spoil during the rehydration step.

Once rehydration is completed, the dairy cream with its burden of rehydrated proteins is transferred to process vessel 20, and the process of making the selected product continues as discussed above.

Variations in the rehydration steps just described may be employed. For example, the mixture of dairy cream and protein concentrate(s) may be transferred from process vessel 50 to process vessel 20 and there cooled and held to complete the rehydration step. Another viable alternative is to add optional product constituents such as vitamins, coloring agents, and preservatives in vessel 50 while the protein concentrate(s) are being blended with the dairy cream in that system component.

In those representative applications of the present invention discussed above, the honey is mixed with the pasteurized feedstock prior to homogenization. An alternative is to blend the honey and feedstock during the subsequent whipping step of the process.

Within the scope of the present invention are products made as discussed above but without lecithin and/or stabilizers. Such products may tend to exhibit syneresis and to melt less smoothly than those in which lecithin and stabilizers are employed, and less control over the texture of the final product is afforded. Otherwise, the products are often comparable, especially as far as flavor and spreadability at refrigeration temperatures are concerned. Also, the manufacturing process is the same except for the omission of the lecithin and/or stabilizer, particularly in that the fat content of the product is adjusted as discussed above and in that the same optional ingredients can be employed.

The illustrated system is for a batch-type process. A continuous process can be obtained by adding a second jacketed process vessel like the one identified by reference character 20 and operating first one process vessel and then the other.

The following examples describe in detail the manufacture of representative honey butters formulated in accord with, and made by processes employing, the principles of the present invention.

EXAMPLE 1

Described in this example is a reduced fat butter which has a honey flavor and can be used as a table spread, a fruit dip, an ingredient in pastry items, and an icing. This product is a particularly superior product in many respects. It is spreadable at temperatures as low as 0° F. It holds its emulsion over an indefinite period of time at this temperature. It also holds its emulsion at refrigeration temperatures of 34° to 45° F.

The formulation for this representative honey butter appears below.

TABLE 2

| Ingredient | Weight | Weight Percent |
|---|---|---|
| Sweet Cream (40% milk fat content) | 262 lbs | 42.99 |
| Sweet Cream (73% milk fat content) (Dairy creams combined to obtain a fat concentration | 98 lbs | 16.08 |

TABLE 2-continued

| Ingredient | Weight | Weight Percent |
|---|---|---|
| of 49%) | | |
| Honey | 240 lbs | 39.38 |
| Salt | 4.5 lbs | 0.738 |
| Lecithin | 1.8 lbs | 0.295 |
| Cultured Skim Milk (Microgard) | 1.44 lbs | 0.236 |
| Vitamin E | 32.69 gms | 0.012 |
| Vitamin A | 5.31 gms | 0.00192 |
| Beta Carotene | 2.005 gms | 0.000725 |
| Mono & Diglycerides (Dimodan O) | 1.5 lbs | 0.246355 |
| Potassium Sorbate | 27.46 gms | 0.01 |
| Sodium Benzoate | 27.46 gms | 0.01 |

The cream was supplied to the process at refrigeration temperature.

The vegetable mono and diglyceride stabilizer was heated to a temperature above 135° F. to melt the product. The stabilizer was a liquid when added to the process vessel.

The remaining ingredients were supplied to the process at room temperature.

The honey butter was made in the system illustrated in the drawing, employing the process steps described above and the following process parameters.

| Process Vessel 20 | |
|---|---|
| Pasteurization and Flavor Development Temperature | 193° F. |
| Holding Time at Temperature | 40 mins |
| Agitator Speed | 25 rpm |
| Holding Vessel 26 | By-passed |
| Cooling Vessel 28 | |
| Hold time | 15 mins |
| Pre-Homogenization Product Temperature | 145° F. |
| Homogenizer 34 (Gaulin Two-Stage) | |
| First Stage Pressure | 1200 psig |
| Second State Pressure | 600 psig |
| | Total = 1800 psig |
| Cooling Unit 36 (Swept Surface Heat Exchanger) | |
| Pre-Whipping Product Temperature | 45° F. |
| Pre-Packing Product Temperature | 45° F. |

The cream, salt, cultured skim milk, Vitamin E, Vitamin A, beta carotene, potassium sorbate, and sodium benzoate were mixed together and held at the 193° F. temperature for pasteurization and flavor development.

During the time that the product was held at 193° F., the melted glyceride stabilizer was added and blended into the mix.

Five minutes prior to the end of the 40 minute hold time, the lecithin was added to the mix.

At the end of the 40 minute hold time, the pasteurized honey was added and blended into the mix.

Then, the temperature of the blend was adjusted to 145° F., and the product was homogenized.

The product was then cooled in unit 36 to 42° F. and transferred to process unit 40. From unit 40, the product was transferred to whipping unit 44, the CM-15 Goodway whipping machine. Here, the product was whipped prior to packaging. The whipping head spun at 1300 rpm, the chamber pressure at the whipping head was 20 psig, the feed pump was run at 50 percent of maximum speed, and the nitrogen pressure setting was 20 psig.

The whipped product was packaged in three-pound tubs and placed in a standard home-type freezer. After 48 hours, the product was evaluated as follows:
1. Product had a rich, full, but not overpowering flavor.
2. Flavor profile was excellent, imparting both the honey and butter flavors.
3. Texture was smooth; and the product was spreadable, even at 0° F.
4. Emulsion held together well from temperatures ranging from 0° F. through 70° F.
5. Product became progressively softer as temperature was increased.

EXAMPLE II

The product described in this example was made using the formulation and process parameters described in EXAMPLE I except:
1. The weight percent of the honey was reduced to 30 percent from 39.28 percent.
2. The fat content of the combined dairy creams was raised to 55 percent from 49 percent.
3. The honey and butter were mixed together after the butter had been manufactured and whipped with a commercial Hobart column mixer.
4. After whipping, the product was packaged in 16-ounce plastic containers and placed in a standard home-freezer.

The product was evaluated 24 hours after being placed in the freezer as follows:
1. The flavor profile was very rich. The honey component was very noticeable but a little mild.
2. The texture was very creamery and smooth, and the product was easily spread directly from the freezer.
3. As the temperature was raised, the product became softer.
4. Mouthfeel was very smooth.
5. Emulsion held together well at temperatures ranging from 0° F. through 70° F.

The product was re-evaluated 60 days and 90 days after manufacture, and there were no apparent changes in the product.

EXAMPLE IV

A honey butter was made as described in EXAMPLE I except:
1. The sweet cream was blended with the higher fat content sweet cream to obtain a fat concentration of 41 percent instead of 49 percent.
2. The whipping head in the Goodway whipping unit was spun at 1500 rpm instead of at 1300 rpm.

The product was packaged in 10-ounce plastic cups and placed in a standard home style freezer. After 24 hours, the product was evaluated. The results were as described in EXAMPLE I except:
1. The butter flavor was slightly weaker, apparently due to the lower level of fat in the product.

The product was re-evaluated at 60 days and 90 days after manufacture; there were no apparent changes in the product.

The invention may be embodied in many forms without departing from the spirit or essential characteristics of the invention. The present embodiments are therefore to be considered in all respects as illustrative and not restrictive, the scope of the invention being indicated by the appended 1. The weight percent of honey was raised to 80 percent from 39.38 percent.
2. The honey was added to the butter after, rather than during, the manufacture of the butter by mixing the honey and butter together and whipping the blend with a standard household mixer.
3. After whipping, the product was packaged in 10-ounce plastic containers and placed in a standard home-type freezer unit.

The product was evaluated 24 hours after being placed in the freezer unit with results as follows:
1. The honey flavor was quite strong.
2. The flavor of the butter was very mild but was noticeably present.
3. The texture was quite sticky, yet the honey butter was spreadable at 0° F.
4. Mouthfeel was very smooth.
5. As the temperature was raised, the product became softer.
6. Emulsion held together well at temperatures ranging from 0° F. through 70° F.

The product was re-evaluated at 60 days and 90 days from the date of production; there were no apparent changes in the product.

EXAMPLE III

The honey butter described in this example was made using the formulation and process parameters described in EXAMPLE I expect:

What is claimed is:

1. A method of making a honey butter which comprises the steps of: providing a feedstock comprising sweet cream or whey cream; pasteurizing said feedstock; blending honey with the pasteurized feedstock in an amount ranging from 20 to 80 percent based on the weight of the product; homogenizing the resulting, honey-containing mixture; cooling said mixture to a temperature in the range of 33° to 65° F.; and whipping the cooled mixture; the providing, pasteurization, and homogenizing of said feedstock and said mixture being so carried out as to effect a phase reversal and consequent formation of an emulsion of liquid in feedstock fat.

2. A method as defined in claim 1 in which lecithin is combined with the feedstock in an effective amount, the lecithin being combined with the feedstock only after the feedstock has been at least partially heated to a pasteurization temperature to thereby minimize thermal degradation of the lecithin.

3. A method as defined in claim 1 which includes the step of adding a stabilizer to the feedstock in an amount sufficient to affect the firmness of the product.

4. A method as defined in claim 3 which employs a gelatin or glyceride stabilizer.

5. A method as defined in claim 1 in which the feedstock comprises the following constituents.

| Ingredient | Weight Percent |
| --- | --- |
| Dairy Cream | 26 to 99 |
| Lecithin | 0.1 to 1.0 |
| Glyceride Stabilizer | 0.1 to 2.5. |

6. A method as defined in claim 1 in which the feedstock contains one or more of the following optional ingredients blended with the sweet cream or whey cream:

| Ingredient | Weight Percent |
| --- | --- |
| Milk Protein Concentrate | 0.1 to 4 |
| Whey Protein Concentrate | 0.25 to 3 |
| Cultured Skim Milk Powder | 0.01 to 1 |
| Salt | 0.25 to 2 |
| Vitamin E | 0.001 to 0.04 |
| Vitamin A | 0.005 to 0.009 |
| Coloring Agent(s) | 0.0005 to 0.002 |
| Preservative(s) | 0.016 to 0.05 |
| Microbial Culture(s) | 0.1 to 10 |
| Flavorant(s) | 0.0005 to 0.01. |

7. A method as defined in claim 6 in which a milk or whey protein concentrate is combined with the dairy cream, in which said concentrate is partially rehydrated before it is combined with the cream, in which a blend containing the cream and the concentrate is heated at an elevated temperature prior to the pasteurization step to further the rehydration of the proteins in the concentrate, and in which the blend is subsequently cooled to a refrigeration temperature and held at that temperature until the rehydration of the proteins is essentially complete.

8. A method as defined in claim 1 in which an inert gas is incorporated into the cooled mixture to inhibit subsequent oxidation of the product.

9. A method as defined in claim 1 in which a milk is blended with the dairy cream to lower the fat content of the product.

10. A method as defined in claim 1 in which a concentrated milk fat, a dairy cream of higher fat content, conventional butter, butter oil, or anhydrous milk fat is blended with the diary cream to increase the fat content of the product.

11. A method as defined in claim 1 in which pasteurization is effected at a temperature in the range of 150° to 210° F. for a time ranging from 15 seconds at a temperature of 210° F. up to 45 minutes at a temperature of 150° F.

12. A method as defined in claim 14 in which the material being pasteurized is heated for from 15 seconds at a temperature of 210° F. to up to three hours at a temperature of 150° F. to pasteurize and to develop flavor in the product.

13. A method as defined in claim 1 in which the blend is homogenized at a temperature in the range of 140° to 165° F.

14. A method as defined in claim 1 in which the honey is one prepared by pasteurizing a feedstock honey, adding an absorbent for undesirable constituents to the honey, and removing the absorbent and its burden of undesirable constituents from the honey.

15. A method of making a honey butter which comprises the steps of: providing a feedstock comprising sweet cream or whey cream; pasteurizing and then homogenizing said feedstock; blending honey with said homogenized feedstock in an amount ranging from 20 to 80 percent based on the weight of the product; and whipping the blend of feedstock and honey; the providing, pasteurization, and homogenizing of said feedstock being so carried out as to effect a phase reversal and consequent formation of an emulsion of liquid in feedstock fat.

16. A method as defined in claim 15 in which lecithin is combined with the feedstock in an effective amount, the lecithin being combined with the feedstock only after the feedstock has been at least partially heated to a pasteurization temperature to thereby minimize thermal degradation of the lecithin.

17. A method as defined in claim 15 which includes the step of adding a stabilizer to the feedstock in an amount sufficient to affect the firmness of the product.

18. A method as defined in claim 17 which employs a gelatin or glyceride stabilizer.

19. A method as defined in claim 15 in which the feedstock comprises the following constituents.

| Ingredient | Weight Percent |
|---|---|
| Dairy Cream | 26 to 99 |
| Lecithin | 0.1 to 1.0 |
| Glyceride Stabilizer | 0.1 to 2.5. |

20. A method as defined in claim 15 in which the feedstock contains one or more of the following optional ingredients blended with the sweet cream or whey cream:

| Ingredient | Weight Percent |
|---|---|
| Milk Protein Concentrate | 0.1 to 4 |
| Whey Protein Concentrate | 0.25 to 3 |
| Cultured Skim Milk Powder | 0.01 to 1 |
| Salt | 0.25 to 2 |
| Vitamin E | 0.001 to 0.04 |
| Vitamin A | 0.005 to 0.009 |
| Coloring Agent(s) | 0.0005 to 0.002 |
| Preservative(s) | 0.016 to 0.05 |
| Microbial Culture(s) | 0.1 to 10 |
| Flavorant(s) | 0.0005 to 0.01. |

21. A method as defined in claim 20 in which a milk or whey protein concentrate is combined with the dairy cream, in which said concentrate is partially rehydrated before it is combined with the cream, in which a blend containing the cream and the concentrate is heated at an elevated temperature prior to the pasteurization step to further the rehydration of the proteins in the concentrate, and in which the blend is subsequently cooled to a refrigeration temperature and held at that temperature until the rehydration of the proteins is essentially complete.

22. A method as defined in claim 15 in which an inert gas is incorporated into the cooled mixture to inhibit subsequent oxidation of the product.

23. A method as defined in claim 15 in which a milk is blended with the dairy cream to lower the fat content of the product.

24. A method as defined in claim 15 in which a concentrated milk fat, a dairy cream of higher fat content, conventional butter, butter oil, or anhydrous milk fat is blended with the diary cream to increase the fat content of the product.

25. A method as defined in claim 15 in which pasteurization is effected at a temperature in the range of 150° to 210° F. for a time ranging from 15 seconds at a temperature of 210° F. up to 45 minutes at a temperature of 150° F.

26. A method as defined in claim 25 in which the material being pasteurized is heated for from 15 seconds at a temperature of 210° F. to up to three hours at a temperature of 150° F. to pasteurize and to develop flavor in the product.

27. A method as defined in claim 15 in which the blend is homogenized at a temperature in the range of 140° to 165° F.

28. A honey butter comprising a homogenized blend of the following ingredients in the stated amounts:

| Ingredients | Weight Percent |
|---|---|
| Dairy Cream | 25 to 99 |
| Pasteurized Honey | 20 to 80 |
| Lecithin | 0.02 to 2.0 |
| Stabilizer | 0.02 to 2.5, | said honey being one which has been freed of unwanted components by absorbtion and filtration.

29. A honey butter as defined in claim 2 in which the dairy cream is sweet cream or whey cream.

30. A honey butter as defined in claim 28 which comprises one or more of the following optional ingredients in an indicated amount:

| Ingredient | Weight Percent |
|---|---|
| Milk Protein Concentrate | 0.1 to 4 |
| Whey Protein Concentrate | 0.02 to 3 |
| Cultured Skim Milk Powder | 0.02 to 3.0 |
| Salt | 0.05 to 2 |
| Vitamin E | 0.002 to 0.1 |
| Vitamin A | 0.001 to 0.009 |
| Coloring Agent(s) | 0.0001 to 0.01 |
| Preservative(s) | 0.0032 to 0.05 |
| Microbial Culture(s) | 0.02 to 10 |
| Flavorant(s) | 0.0001 to 0.05. |

31. A honey butter as defined in claim 28 which comprises a dairy product in an amount effective to adjust the fat content of the product.

32. A honey butter as defined in claim 31 which comprises milk or skim milk.

33. A honey butter as defined in claim 31 which comprises concentrated milk fat, a dairy cream of higher fat content, conventional butter, butter oil, or anhydrous milk fat.

34. A honey butter as defined in claim 31 in which the stabilizer comprises a glyceride or a gelatin.

35. A honey butter as defined in claim 31 which has a phase that is predominantly a liquid-in-fat emulsion.

36. A honey butter as defined in claim 28 which is spreadable at refrigeration temperature.

37. A honey butter as defined in claim 28 which is a reduced fat butter.

38. A honey butter as defined in claim 28 which is a light butter.

39. A whipped honey butter which is formulated as defined in claim 28.

* * * * *

UNITED STATES PATENT AND TRADEMARK OFFICE
CERTIFICATE OF CORRECTION

PATENT NO. : 5,468,513

DATED : November 21, 1995

INVENTOR(S) : Robert N. Fackrell; Lorenzo P. Griffeth

It is certified that error appears in the above-indentified patent and that said Letters Patent is hereby corrected as shown below:

Column 10, between line 22 and 23 insert

—1. The weight percent of honey was raised to 80 percent from 39.38 percent.
2. The honey was added to the butter after, rather than during, the manufacture of the butter by mixing the honey and butter together and whipping the blend with a standard household mixer.
3. After whipping, the product was packaged in 10-ounce plastic containers and placed in a standard home-type freezer unit.

The product was evaluated 24 hours after being placed in the freezer unit with results as follows:

1. The honey flavor was quite strong.
2. The flavor of the butter was very mild but was noticeably present.
3. The texture was quite sticky, yet the honey butter was spreadable at 0°F.
4. Mouthfeel was very smooth.
5. As the temperature was raised, the product became softer.
6. Emulsion held together well at temperatures ranging from 0°F. through 70°F.

The product was re-evaluated at 60 days and 90 days from the date of production; there were no apparent changes in the product.

UNITED STATES PATENT AND TRADEMARK OFFICE
CERTIFICATE OF CORRECTION

PATENT NO. : 5,468,513
DATED : November 21, 1995
INVENTOR(S) : Robert N. Fackrell; Lorenzo P. Griffeth It is certified that error appears in the above-indentified patent and that said Letters Patent is hereby corrected as shown below:

EXAMPLE III
The honey butter described in this example was made using the formulation and process parameters described in EXAMPLE I expect:--

Signed and Sealed this

Twenty-sixth Day of November 1996

Attest:

BRUCE LEHMAN

*Attesting Officer*  *Commissioner of Patents and Trademarks*